US012718980B2

(12) United States Patent
Kim et al.

(10) Patent No.: US 12,718,980 B2
(45) Date of Patent: Aug. 25, 2026

(54) COIL COMPONENT

(71) Applicant: SAMSUNG ELECTRO-MECHANICS CO., LTD., Suwon-si (KR)

(72) Inventors: Young Ji Kim, Suwon-si (KR); Jin Ho Ku, Suwon-si (KR); Min Jeong Kim, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 1056 days.

(21) Appl. No.: 17/828,437

(22) Filed: May 31, 2022

(65) Prior Publication Data

US 2022/0406519 A1 Dec. 22, 2022

(30) Foreign Application Priority Data

Jun. 21, 2021 (KR) ........................ 10-2021-0079843

(51) Int. Cl.
*H01F 27/32* (2006.01)
*H01F 27/29* (2006.01)

(52) U.S. Cl.
CPC ......... *H01F 27/324* (2013.01); *H01F 27/292* (2013.01)

(58) Field of Classification Search
CPC ............................. H01F 27/324; H01F 27/292
See application file for complete search history.

(56) References Cited

U.S. PATENT DOCUMENTS

| | | | | |
|---|---|---|---|---|
| 2002/0101683 | A1 | 8/2002 | Katakura | |
| 2012/0112869 | A1 | 5/2012 | Nishikawa et al. | |
| 2016/0293322 | A1 | 10/2016 | Yosui | |
| 2017/0243689 | A1* | 8/2017 | Yoon | H01F 17/04 |
| 2018/0122546 | A1 | 5/2018 | Lee et al. | |
| 2019/0259529 | A1* | 8/2019 | Cho | H01F 17/0013 |
| 2019/0279813 | A1* | 9/2019 | Jang | H01F 27/366 |
| 2019/0333679 | A1* | 10/2019 | Lee | H01F 27/2804 |
| 2020/0020477 | A1* | 1/2020 | Kang | H01F 17/0013 |
| 2020/0027647 | A1* | 1/2020 | Yang | H01F 17/0013 |
| 2020/0135374 | A1 | 4/2020 | You et al. | |
| 2020/0286673 | A1 | 9/2020 | Yoon et al. | |

(Continued)

FOREIGN PATENT DOCUMENTS

| | | |
|---|---|---|
| CN | 102468034 A | 5/2012 |
| CN | 206022030 U | 3/2017 |

(Continued)

OTHER PUBLICATIONS

Office Action issued in corresponding Korean Patent Application No. 10-2021-0079843 on Aug. 22, 2025, with English translation.

(Continued)

*Primary Examiner* — Malcolm Barnes
(74) *Attorney, Agent, or Firm* — MORGAN, LEWIS & BOCKIUS LLP

(57) ABSTRACT

A coil component includes a body having first to fourth side surfaces, a coil disposed in the body, and an insulating member disposed on at least one of the first to fourth side surfaces of the body and including first to third insulating layers. The insulating member may include first and second insulating members respectively disposed on the third and fourth side surfaces.

21 Claims, 6 Drawing Sheets

(56) References Cited

U.S. PATENT DOCUMENTS

| | | | |
|---|---|---|---|
| 2021/0057138 | A1 | 2/2021 | Yang et al. |
| 2021/0057146 | A1 | 2/2021 | Yang et al. |

FOREIGN PATENT DOCUMENTS

| | | | |
|---|---|---|---|
| CN | 108010660 | A | 5/2018 |
| CN | 111667970 | A | 9/2020 |
| JP | 2002-151332 | A | 5/2002 |
| KR | 10-2019-0123849 | A | 11/2019 |
| KR | 10-2020-0048972 | A | 5/2020 |
| KR | 10-2176276 | B1 | 11/2020 |
| KR | 10-2021-0022363 | A | 3/2021 |
| TW | 1643221 | B | 12/2018 |

OTHER PUBLICATIONS

Office Action issued in corresponding Chinese Patent Application No. 202210700422.4 dated May 14, 2026, with English translation.

* cited by examiner

COIL COMPONENT

CROSS-REFERENCE TO RELATED APPLICATION

This application claims benefit of priority to Korean Patent Application No. 10-2021-0079843 filed on Jun. 21, 2021 in the Korean Intellectual Property Office, the disclosure of which is incorporated herein by reference in its entirety.

TECHNICAL FIELD

The present disclosure relates to a coil component.

BACKGROUND

An inductor, a coil component, is a typical passive electronic component used in electronic devices along with a resistor and a capacitor.

As electronic devices have been implemented with high performance and have become smaller, the number of electronic components used in electronic devices has been increased and miniaturized.

Meanwhile, as power inductors require not only L electrode but also bottom electrode products, an insulating method required in a chip manufacturing process has also become important due to the characteristics of products using high current plating conditions.

A structure of the power inductor includes an internal coil (Cu), a body (magnetic metal), and an electrode portion (Cu, Ni, and Sn), which are all conductors, and in order to allow current to selectively flow, a process of insulating unnecessary parts is essentially entailed. In this regard, research on efficiently insulating the remainder of a body except for the electrode portion on which a chip is mounted has continued, and recently, an insulating process is performed through a screen-printing method using an insulating paste.

SUMMARY

An aspect of the present disclosure may provide a coil component that can be mounted on a substrate including a microcircuit pattern.

An aspect of the present disclosure may also provide a coil component capable of reducing an incidence of defective products.

An aspect of the present disclosure may also reduce costs and time for manufacturing a coil by reducing an insulating process.

According to an aspect of the present disclosure, a coil component includes a body having first to fourth side surfaces, a coil disposed in the body, and an insulating member disposed on at least one of the first to fourth side surfaces of the body and including first to third insulating layers.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
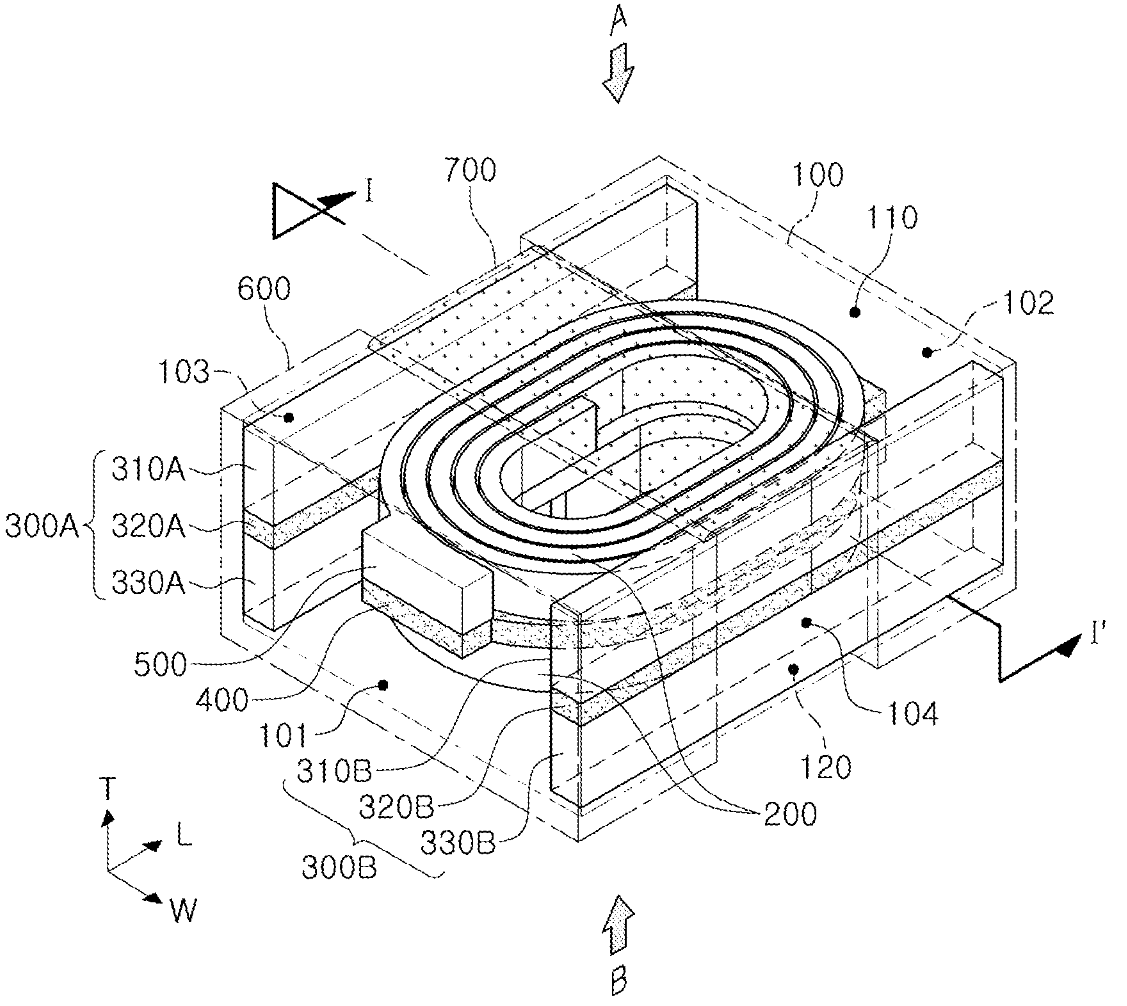
FIG. 1 is a view schematically illustrating a coil component according to the present disclosure.

Exemplary embodiments of the present disclosure will now be described in detail with reference to the accompanying drawings.

In the drawings, an L direction may be defined as a first direction or length direction, a W direction may be defined as a second direction or width direction, and a T direction may be defined as a third direction or thickness direction.

Hereinafter, a coil component according to an exemplary embodiment in the present disclosure will be described in detail with reference to the accompanying drawings, and in the description with reference to the accompanying drawings, the same or corresponding components are given the same reference numerals, and a repeated description thereof will be omitted.

Various types of electronic components are used in electronic devices, and among these electronic components, various types of coil components may be appropriately used for the purpose of removing noise and the like.

That is, in electronic devices, a coil component may be used as a power inductor, a high frequency inductor, a general bead, a high frequency bead (GHz Bead), a common mode filter, or the like.

Coil Component and Method for Manufacturing Coil Component

FIG. 1 is a view schematically illustrating a coil component according to the present disclosure.

Referring to FIG. 1, a coil component according to an exemplary embodiment in the present disclosure may include a body 100, a coil 200 disposed in the body 100, and an insulating member 300 disposed on a side surface of the body. Here, the body 100 may have a first side surface 101, a second side surface 102 opposing the first side surface, and third and fourth side surfaces 103 and 104 connected to each of the first and second side surfaces 101 and 102 and opposing each other. The insulating member 300 may be disposed on at least one of the first to fourth side surfaces 101, 102, 103, and 104 of the body. In this case, the insulating member 300 may include first and second insulating members 300A and 300B disposed on the third and fourth side surfaces 103 and 104 of the body, respectively.

The body 100 forms the exterior of the coil component according to the present exemplary embodiment, and the coil 200 is embedded therein. The body 100 may be formed in a hexahedral shape as a whole.

The body 100 may include a magnetic material and an insulating resin. Specifically, the body 100 may be formed by laminating one or more magnetic composite sheets including an insulating resin and a magnetic material dispersed in the insulating resin. However, the body 100 may have a structure other than the structure in which a magnetic material is dispersed in an insulating resin. For example, the body 100 may be formed of a magnetic material such as ferrite.

The magnetic material may be ferrite or metallic magnetic powder.

Ferrite powder may be at least one of, for example, spinel type ferrite such as Mg—Zn-based ferrite, Mn—Zn-based ferrite, Mn—Mg-based ferrite, Cu—Zn-based ferrite, Mg—Mn—Sr-based ferrite, or Ni—Zn-based ferrite, hexagonal ferrites such as Ba—Zn-based ferrite, Ba—Mg-based ferrite, Ba—Ni-based ferrite, Ba—Co-based ferrite, or Ba—Ni—Co-based ferrite, garnet type ferrite such as Y-based ferrite, and Li-based ferrite.

Metal magnetic powder may include at least any one selected from the group consisting of iron (Fe), silicon (Si), chromium (Cr), cobalt (Co), molybdenum (Mo), aluminum (Al), niobium (Nb), copper (Cu) and nickel (Ni). For example, the metal magnetic powder may be at least one of pure iron powder, Fe—Si-based alloy powder, Fe—Si—Al-based alloy powder, Fe—Ni-based alloy powder, Fe—Ni—Mo-based alloy powder, Fe—Ni—Mo—Cu-based alloy powder, Fe—Co-based alloy powder, Fe—Ni—Co-based alloy powder, Fe—Cr-based alloy powder, Fe—Cr—Si alloy powder, Fe—Si—Cu—Nb-based alloy powder, Fe—Ni—Cr-based alloy powder, and Fe—Cr—Al-based alloy powder.

The metal magnetic powder may be amorphous or crystalline. For example, the metal magnetic powder may be Fe—Si—B—Cr-based amorphous alloy powder, but is not limited thereto.

Ferrite and the metal magnetic powder may have an average diameter of about 0.1 μm to 30 μm, but is not limited thereto.

The body 100 may include two or more types of magnetic materials dispersed in a resin. Here, the different types of magnetic materials refer to that magnetic materials dispersed in an insulating resin are distinguished from each other by any one of an average diameter, a composition, crystallinity, and a shape.

The insulating resin may include, but is not limited to, epoxy, polyimide, liquid crystal polymer, or the like alone or in combination.

The coil 200 may be embedded in the body 100. The coil component according to the present disclosure exhibits its characteristics from the coil 200. For example, when the coil component of the present exemplary embodiment is used as a power inductor, the coil 200 may serve to stabilize power of the electronic device by maintaining an output voltage by storing an electric field as a magnetic field. Here, the coil 200 is not limited to a thin-film coil, but may correspond to a winding-type coil or a laminated-type coil.

The coil component according to the present exemplary embodiment is a thin film type coil including a substrate 400, but as described above, a type of the coil 200 is not limited thereto.

In the coil component according to the present exemplary embodiment, the coil 200 may be disposed on upper and lower portions of the substrate 400, and here, the coil component may include a via penetrating through the substrate 400 to connect the upper and lower portions of the coil but the present disclosure is not limited thereto.

The coil 200 may be disposed in the body 100 to be spaced apart from the insulating member 300.

The insulating member 300 may include first and second insulating members 300A and 300B, and each insulating member may include first to third insulating layers 310, 320, and 330. More specifically, the first insulating member 300A disposed on the third side surface 103 of the body 100 may include first to third insulating layers 310A, 320A, and 330A, and the second insulating member 300B disposed on the fourth side surface 104 of the may include the first to third insulating layers 310B, 320B, and 330B, but is not limited thereto. In some embodiments, the first to third insulation layers are disposed on the same side surface of the body. In particular, in the present disclosure, the first to third insulating layers are not distinguished from each other by names of the first and second insulating members, but a first insulating layer may refer to the first insulating layers 310A and 310B of the first and second insulating members.

The coil component according to the present exemplary embodiment may further include the substrate 400. The substrate 400 may be embedded in the body 100. The substrate 400 may be configured to support the coil 200 to be described later, but is not limited thereto.

Also, the substrate 400 supporting the coil 200 may be disposed to be spaced apart from the insulating member 300. More specifically, the substrate 400 supporting the coil 200 may be spaced apart from each of the first to third insulating layers 310, 320, and 330 of the insulating member 300.

The substrate 400 may be formed of an insulating material including a thermosetting insulating resin such as an epoxy resin, a thermoplastic insulating resin such as polyimide, or a photosensitive insulating resin, or may be formed of an insulating material formed by impregnating an insulating resin with a reinforcing material such as glass fiber or an inorganic filler. For example, the substrate 400 may be formed of an insulating material such as a copper clad laminate (CCL), unclad CCL, prepreg, Ajinomoto build-up film (ABF), FR-4, bismaleimide triazine (BT) film, photo imagable dielectric (PID) film, but the present disclosure is not limited thereto.

As an inorganic filler, at least one selected from the group consisting of silica ($SiO_2$), alumina ($Al_2O_3$), silicon carbide (SiC), barium sulfate ($BaSO_4$), talc, mud, mica powder, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$) and calcium zirconate ($CaZrO_3$) may be used.

When the substrate 400 is formed of an insulating material including a reinforcing material, the substrate 400 may provide more excellent rigidity. When the substrate 400 is formed of an insulating material not including glass fibers, a volume of the coil 200 may be increased within the same size of the body 100.

When the substrate 400 is formed of an insulating material including a photosensitive insulating resin, the number of processes for forming the coil 200 may be reduced, advantageously reducing production costs and forming fine vias.

The first to third insulating layers 310, 320, and 330 of the insulating member 300 may be sequentially laminated. More specifically, the uppermost first insulating layer 310, an intermediate second insulating layer 320, and the lowermost third insulating layer 330 may be sequentially disposed. In this case, the second insulating layer 320 may be in contact with each of the first and third insulating layers 310 and 330.

The coil 200 may be spaced apart from each of the first to third insulating layers 310, 320, and 330 of the insulating member 300.

In addition, the coil component according to the present disclosure may further include the substrate 400 supporting the coil 200, wherein the substrate 400 may include the same material as that of the second insulating layer 320 of the insulating member 300, but is not limited thereto. In this case, the same thickness may be a case in which average thicknesses of the substrate 400 and the second insulating layer 320 according to a thickness measuring method to be described later are the same. More specifically, the same thickness may be a case in which average values of thicknesses obtained by cutting an certain point of the coil component in the length direction (L direction) in the width direction (W direction) so that each of the second insulating layer 320 and the substrate 400 is exposed and measuring an certain point of a cut surface of each of the second insulating layer 320 and the substrate 400 a plurality of times or measuring a plurality of certain points one or more times are the same. Meanwhile, the length, width, and thickness of the coil component described above exclude tolerance, and the actual length, width, and thickness of the coil component based on the tolerance may be different from the values mentioned above.

Meanwhile, in a coil bar state before a dicing process, the substrate 400 on which the first and third insulating layers 310 and 330 are laminated may extend from the coil 200 to form the second insulating layer 320, so that the substrate 400 and the second insulating layer 320 may have the same thickness.

In this case, a specific method of measuring the thickness of the second insulating layer 320 and the substrate 400 of the insulating member 300 is as follows.

A certain point of the coil component in the length direction (L direction) is cut in the width direction (W direction). Here, after cutting, each of the second insulating layer 320 and the substrate 400 should be exposed.

Thereafter, lengths or heights of the exposed second insulating layer 320 and the substrate 400 in the thickness direction (T direction) are measured, respectively. In this case, the measured values of the thicknesses of the second insulating layer 320 and the substrate 400 may correspond to an average value of values measured a plurality of times, and a method of measuring the thicknesses a plurality of times is as follows.

A certain point of the cut surface of each of the second insulating layer 320 and the substrate 400 may be measured a plurality of times. In this case, an arithmetic mean value of the plurality of measurement values may correspond to the thickness measurement values of the second insulating layer 320 and the substrate 400.

Also, a plurality of certain points of the cut surfaces of the second insulating layer 320 and the substrate 400 may be measured one or more times. In this case, an arithmetic mean value of the plurality of measurement values may correspond to the thickness measurement values of the second insulating layer 320 and the substrate 400.

The insulating member 300 of the coil component according to the present disclosure may be disposed on at least one of the first to fourth side surfaces 101, 102, 103 and 104 of the body 100, and may cover the entire third and fourth side surfaces 103 and 104 of the body. More specifically, as will be described later, the body 100 has the first and second side surfaces 101 and 102 through which a lead pattern 500 connected to the coil 200 is exposed, and the insulating member 300 may cover the entire third and fourth side surfaces 103 and 104 connected to each of the first and second side surfaces 101 and 102 of the body and opposing each other. In this case, the insulating member 300 may cover at least a portion of the first and second side surfaces 101 and 102 of the body.

In addition, the insulating member 300 may have one surface 301 and the other surface 302 facing the one surface, and in this case, each of the one surface and the other surfaces 301 and 302 of the insulating member may be at least partially in contact with the body 100.

FIG. 1 shows only the substrate 400 and the first and second insulating members 300A and 300B exposed to the first and fourth side surfaces 101 and 104 of the body, but the first and second insulating members 300A and 300B may also be equally disposed on the second and third side surfaces 102 and 103. That is, at least a portion of the insulating member 300 may be exposed from four side surfaces of the body 100.

In this case, when the substrate supporting the coil 200 is not disposed, only the first and second insulating members 300A and 300B may be exposed to the first and fourth side surfaces 101 and 104 of the body 100.

In addition, the insulating member 300 exposed to the first and second side surfaces 101 and 102 of the body 100 may not extend to both ends of the first and second side surfaces 101 and 102 of the body, respectively. Specifically, the insulating member 300 exposed to the first and second side surfaces 101 and 102 of the body may expose each of the coil 200 and the lead pattern 500, may further expose the substrate 400 supporting the coil 200, and may expose the first and second insulating members 300A and 300B disposed to be spaced apart from each of the coil 200 and the lead pattern 500, but the present disclosure is not limited thereto. In particular, when the substrate 400 supporting the coil 200 is disposed, the substrate 400 may be further exposed to be spaced apart from each of the first and second insulating members 300A and 300B.

Accordingly, instead of an insulation printing process on the side of the coil component, the insulating member 300 covers for a function thereof, so that magnetic powder on the side surface and upper and lower corners of the body 100 may be blocked, thereby improving plating spread.

In particular, since a side insulation process of the body 100 is unnecessary, a process time and equipment cost may be reduced.

Each of the first and third insulating layers 310 and 330 of the insulating member 300 may include a material different from that of the second insulating layer 320. In particular, the second insulating layer 320 may include a prepreg (PPG), at least one of the first and third insulating layers 310 and 330 of the insulating member 300 may be formed of a photosensitive material (DFR), and the photosensitive material may be a known DFR film. For example, a photosensitive organic material or a photosensitive resin may be included. The photosensitive material refers to a material that causes a chemical change when irradiated with light, which means that it causes changes such as dissolution and solidification in response to light of a specific wavelength, and may include polyamide resin, polyimide resins, photosensitive polyester resins, epoxy resins, amino resins, cyclopentanone, polymer resins, and the like.

More specifically, the photosensitive material may be a material in which a base film layer, a photosensitive layer and a cover film layer are sequentially laminated, and the photosensitive layer may include an acrylic resin, but is not limited thereto. In addition, the photosensitive layer may include at least one of methanol, acetone, and toluene.

When the substrate 400 supporting the coil 200 is disposed, the second insulating layer 320 of the insulating member may include the same material as that of the substrate 400, and the substrate 400 and the second insulating layer 320 may each include a prepreg (PPG), but is not limited thereto. In this case, the second insulating layer 320 of the insulating member 300 may have the same thickness as the substrate 400.

In addition, the glass fibers impregnated in the prepreg may be exposed to side surfaces of the substrate 400 and the second insulating layer 320. More specifically, in the coil bar state before the dicing process, the substrate 400 on which the first and third insulating layers 310 and 330 are laminated extends from the coil 200, and the substrate supporting the coil 200 through a support substrate trimming process and the second insulating layer 320 are disposed to be spaced apart from each other. That is, while the trimming process is performed on the substrate, the glass fibers impregnated in the prepreg (PPG) may be exposed.

Here, each of the glass fiber exposed to the side surface of the substrate 400 and the glass fiber exposed to the side surface of the second insulating layer 320 may be in contact with a first coating layer C1 covering the coil 200 and a second coating layer C2 covering the insulating member 300. Here, each of the first and second coating layers C1 and C2 may be formed to be spaced apart from each other.

The first coating layer C1 and the second coating layer C2 may include the same material, but is not limited thereto.

The coil component according to the present exemplary embodiment may further include the lead pattern 500 disposed in the body 100, connected to the coil 200, and at least partially exposed to each of the first and second side surfaces 101 and 102 of the body. In this case, the insulating member 300 spaced apart from the lead pattern 500 may be disposed on or exposed to each of the first and second side surfaces 101 and 102 of the body.

Each of the coil 200, the lead pattern 500, and the via may be formed of a conductive material such as copper (Cu), aluminum (Al), silver (Ag), tin (Sn), gold (Au), nickel (Ni), and lead (Pb), titanium (Ti), or an alloy thereof, but is not limited thereto.

The coil component according to the present exemplary embodiment may further include an external electrode 600 disposed on at least a portion of the first to fourth side surfaces 101, 102, 103, and 104 of the body 100. Here, at least a portion of the external electrode 600 may be in contact with the lead pattern 500 on each of the first and second side surfaces 101 and 102 of the body.

Referring to the drawings, the external electrode 600 covers five surfaces of the body, but is not limited thereto, and may be formed to cover three surfaces of upper and lower surfaces and side surface of the body 100.

In addition, the external electrode 600 may be in contact with at least some of the first to third insulating layers 310, 320, and 330 of the insulating member 300 exposed to the first and second side surfaces 101 and 102 of the body, respectively, and the lead pattern 500. In addition, when the substrate 400 supporting the coil 200 is disposed, the external electrode 600 may be further in contact with at least a portion of the substrate 400 exposed to each of the first and second side surfaces 101 and 102 of the body.

A metal included in the external electrode 600 may be formed of two or more alloys selected from among tin (Sn), lead (Pb), indium (In), copper (Cu), silver (Ag), and bismuth (Bi).

The external electrode 600 may be formed by applying a conductive resin paste or may be formed by plating a material including the metal material, but is not limited thereto.

Meanwhile, although not shown in FIG. 1, the coil component according to the present exemplary embodiment may further include an insulating layer disposed between the coil 200 and the body 100. The insulating layer may be formed by at least one of a vapor deposition method and a film lamination method. Meanwhile, in the latter case, the insulating layer may be a permanent resist in which a plating resist used in plating the coil 200 on the substrate 400 remains in a final product, but the present disclosure is not limited thereto.

In addition, the coil component according to the present exemplary embodiment may not include a side insulating layer surrounding two side surfaces connected to one side surface 103 of the body 100. In this case, the first and second insulating members 300A and 300B laminated on the substrate 400 may function as the external insulating layer.

In addition, the body 100 may further include one surface and the other surfaces 110 and 120 connected to each of the first to fourth side surfaces 101, 102, 103, and 104 and facing each other. In this case, an insulating film 700 may be additionally disposed on each of the one and the other surfaces 110 and 120 of the body.

In this case, each of the first and second insulating members 300A and 300B may at least partially contact each insulating film 700 disposed on one surface and the other surface 110 and 120 of the body. Here, each of the insulating films 700 disposed on one and the other surfaces 101 and 102 of the body may not extend to both ends of the one surface and the other surfaces 110 and 120 of the body, and thus, a length of the insulating film 700 in the length direction (L direction) may be shorter than a length thereof in the length direction (L direction) of the first and second insulating members 300A and 300B.

In addition, the insulating film 700 may include a material different from that of each of the first and second insulating members 300A and 300B, but is not limited thereto. In particular, the insulating film 700 may include a material different from each of the first and third insulating layers 310 and 330 of the insulating member 300. The first and third insulating layers 310 and 330 of the insulating member may correspond to an insulating material laminated before the dicing process of the coil bar, but the insulating film 700 disposed on each of the one surface and the other surfaces 110 and 120 of the body 100 may be formed by applying an insulating paste after dicing, so the materials may be different. In this case, each of the first and third insulating layers 310 and 330 of the insulating member may include a photosensitive material (DFR), but is not limited thereto.

In addition, the external electrode 600 may further include a plating layer. In this case, the plating layer may include a conductive material. The plating layer may be electrically connected to a solder, which is a connection conductor. In this case, the plating layer may include nickel (Ni) or tin (Sn), and may have a structure in which a nickel (Ni) plating layer and a tin (Sn) plating layer are sequentially laminated. When the external electrode is a conductive resin layer, the nickel (Ni) plating layer is in contact with a conductive connection portion of a conductive resin layer inside the external electrode 600 and the base resin.

Through such an insulating process of the body, the magnetic powder at the edges of the side surface and upper and lower surfaces of the body 100 may be blocked, thereby improving plating spread.

In particular, since a side insulation process of the body 100 is unnecessary, a process time and equipment cost may be reduced.

Figure 2:
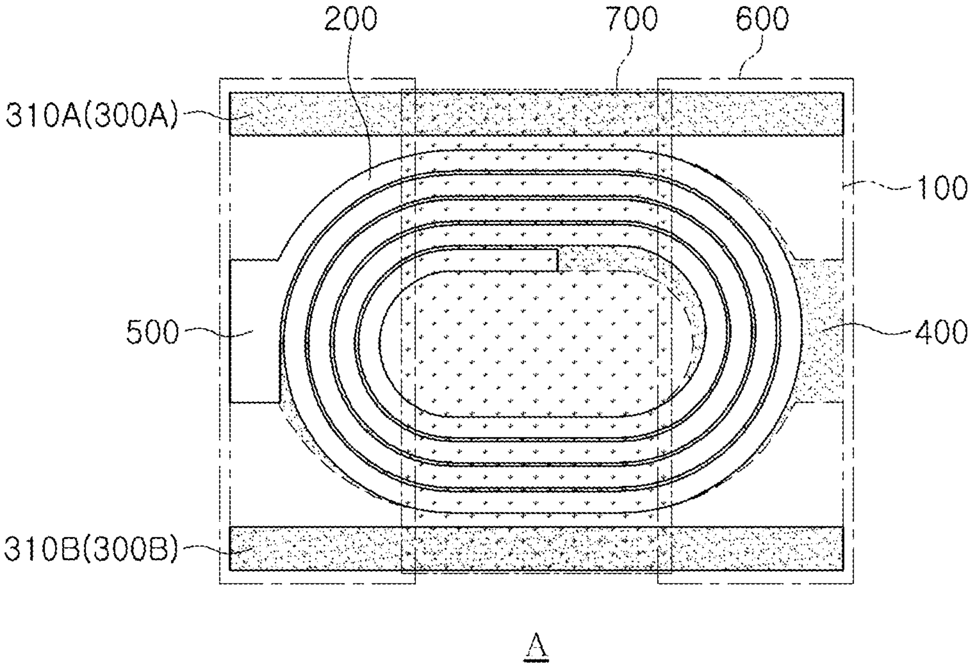
FIG. 2 is a view illustrating the coil component of FIG. 1 viewed from above (direction A)
Figure 3:
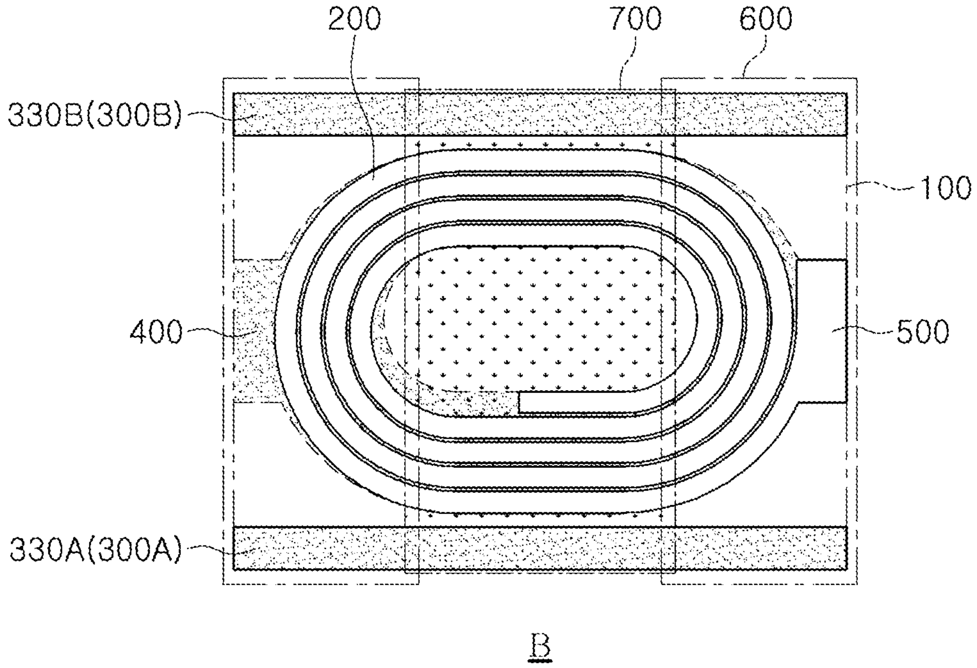
FIG. 3 is a view illustrating the coil component of FIG. 1 viewed from below (direction B)

FIGS. 2 and 3 are views illustrating the coil component of FIG. 1 as viewed from an upper side (A direction) and the lower side (B direction).

FIG. 2 shows that one surface 301 of the insulating member 300 spaced apart from the coil 200 disposed in the body 100 is shown. Referring to FIG. 2, in the coil component according to an exemplary embodiment in the present disclosure, first and second insulating members 300A and 300B may be disposed on the third and fourth side surfaces 103 and 104 and spaced apart from the coil 200. In this case, the first and second insulating members 300A and 300B may cover the entire third and fourth side surfaces 103 and 104 of the body.

In addition, FIG. 3 shows that the other surface 302 of the insulating member 300 spaced apart from the coil 200 disposed in the body 100 is shown. Referring to FIG. 3, in the coil component according to an exemplary embodiment in the present disclosure, first and second insulating members 300A and 300B may be disposed on the third and fourth side surfaces 103 and 104 of the body 100 and spaced apart from the coil 200.

Each of the substrate 400, the lead pattern 500, and the insulating member 300 exposed from the body 100 may at least partially contact the external electrode 600, but the present disclosure is not limited thereto.

Other components are substantially the same as those described above, and thus, detailed descriptions thereof will be omitted.

Figure 4:
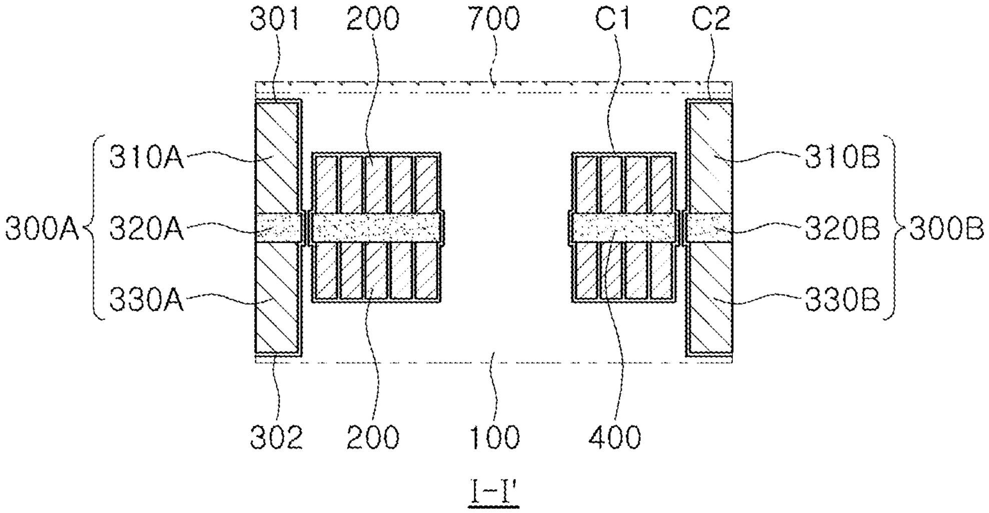
FIG. 4 is a view illustrating a cross-section, taken along line I-I' of FIG. 1.

FIG. 4 is a view illustrating a cross-section taken along line I-I' of FIG. 1.

Referring to FIG. 4, the coil component according to the present exemplary embodiment includes a via penetrating through the substrate 400 to connect the coils 200 formed at upper and lower portions of the substrate 400. In some embodiments, the second insulation layer may extend beyond the first insulation layer along a direction orthogonal to a longitudinal axis of the first and second insulation layers. In some embodiments, the second insulation layer may extend beyond the third insulation layer along a direction orthogonal to a longitudinal axis of the second and third insulation layers.

In addition, the coil component according to the present exemplary embodiment may further include a first coating layer C1 covering the coil 200. The first coating layer C1 may be formed to extend to cover each of the upper, lower, and side surfaces of the substrate 400, but is not limited thereto. In addition, the coil component according to the present exemplary embodiment may further include a second coating layer C2 covering the insulating member 300. In this case, glass fiber exposed to the side surface of the substrate 400 and the first coating layer C1 covering the coil 200 and extending to the side surface of the substrate 400 may be in contact with each other. In addition, the second coating layer C2 covering the insulating member 300 may be in contact with glass fiber exposed to the side surface of the second insulating layer 320 of the insulating member 300, but is not limited thereto.

In addition, the insulating member 300 may have one surface 301 and the other surface 302 facing the one surface, and here, each of the one surface and the other surfaces 301 and 302 of the insulating member may at least partially contact the body 100.

The coil component according to the present exemplary embodiment includes the insulating member 300 spaced apart from the coil 200 covered with the insulating layer. More specifically, the insulating member 300 may be disposed on the third and fourth side surfaces 103 and 104 of the body 100 and extend to both ends of the third and fourth side surfaces 103 and 104 of the body 100.

Here, the substrate 400 supporting the coil 200 and the insulating member 300 may be spaced apart from each other, and the substrate 400 may be formed of the same material as that of the second insulating layer 320 of the insulating member 300 and may be formed to have the same thickness, but the present disclosure is not limited thereto. A method of measuring the thickness of the substrate 400 and the second insulating layer 320 is the same as that described above, but is not limited thereto.

Instead of the insulating printing process on the side of the coil component, the first and second insulating members 300A and 300B disposed on the side surface of the body cover for a function of an insulating material, so that the magnetic powder on the edges of the side surface and upper and lower surfaces of the body 100 may be blocked, thereby improving plating spread.

In particular, since a side insulation process of the body 100 is unnecessary, a process time and equipment cost may be reduced.

Other components are substantially the same as those described above, and thus, detailed descriptions thereof will be omitted.

Figure 5A:
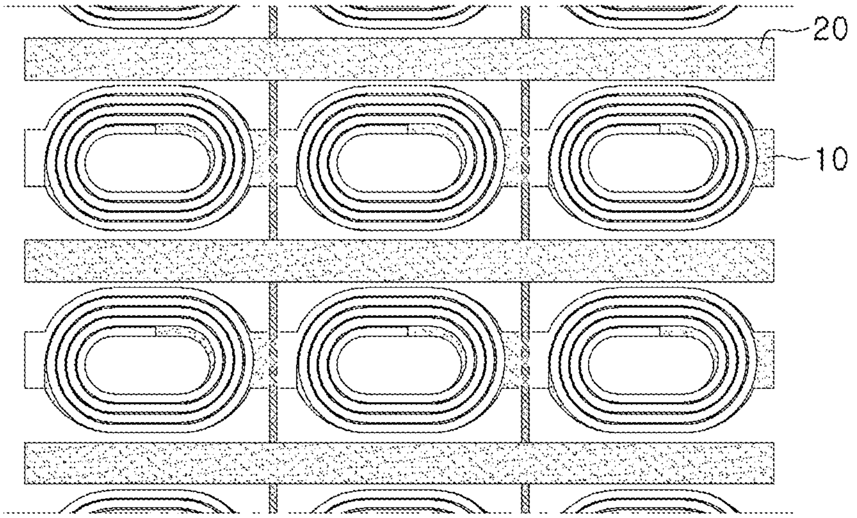
FIGS. 5A through 5C are diagrams schematically illustrating a manufacturing process of a coil component according to an exemplary embodiment in the present disclosure.
Figure 5B:
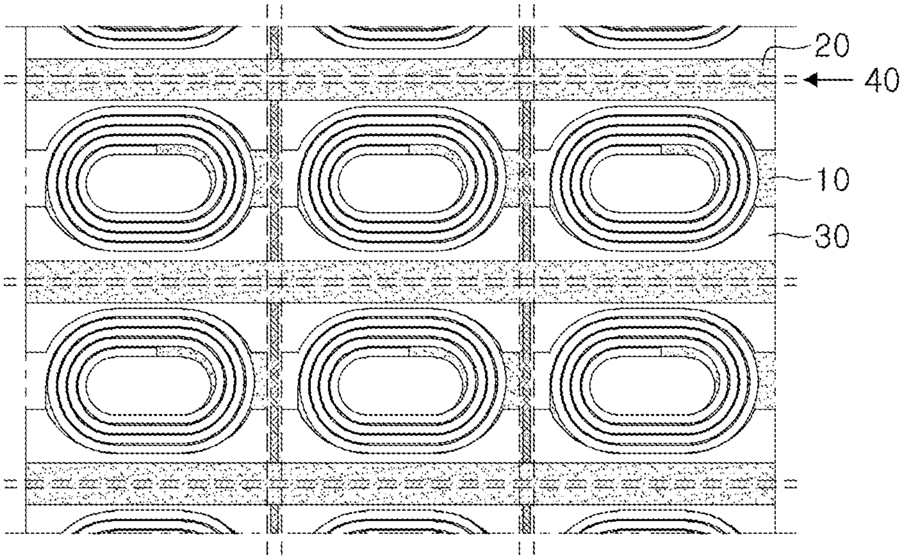
Figure 5C:
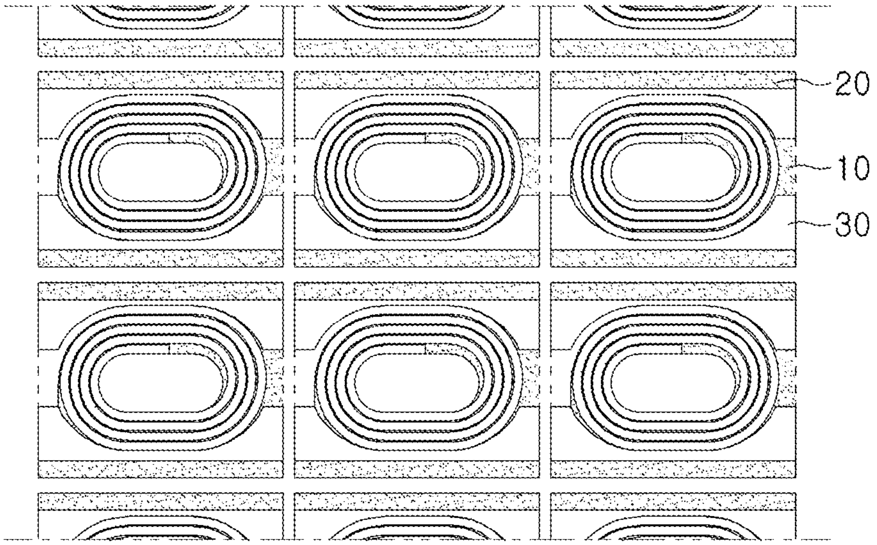

FIGS. 5A through 5C are diagrams schematically illustrating a manufacturing process of a coil component according to an exemplary embodiment in the present disclosure.

In general, in a coil bar state in which magnetic composite sheets are laminated to cover a plurality of coils connected to each other, a plurality of coils may be individualized as individual components through a dicing process.

In the coil component according to the present disclosure, by laminating an insulating material on the upper and lower portions of the substrate before the dicing process, the side insulation process for the coil component body after dicing may be unnecessary, thereby shortening a process time and reducing equipment cost.

First, the coil 10 is disposed on the upper and lower portions of the substrate formed for forming a coil bar, and an insulating material 20 is laminated to be spaced apart from the coil 10. In this case, the insulating material 20 may not be disposed in a region in which a lead pattern of the coil 10 is formed. That is, as shown in FIG. 5A, the insulating material 20 is disposed only on the upper and lower portions of the coil 10, and may not be disposed on the left and right sides.

As will be described later, a width of the insulating material 20 should be formed thicker than the dicing line, so that the insulating material 20 remains on the side surface of the body on which the magnetic sheet 30 is laminated even after the dicing process, so as to function as an insulating layer covering the side surface of the body.

Thereafter, a process of trimming the substrate is performed except for a portion in which the coil 10 and the insulating material 20 are laminated, and a first coating layer covering the coil 10 and a second coating layer covering the insulating material 20 are laminated. When the substrate is trimmed, a vertically extending substrate may remain on each of the left and right sides of the coil 10 in order to connect the coil 10 and the substrate disposed below each of the insulating material 20.

Thereafter, the magnetic sheet 30 is laminated and a dicing process is performed. The magnetic sheet 30 constitutes the body of the coil component, and is laminated on all portions except the coil 10 and the insulating material 20. After the magnetic sheet 30 is laminated, the substrate disposed between the coil 10 may not be visually checked, but for convenience, the process in which the vertically extended substrate is removed during the dicing process is illustrated in FIG. 5B.

Also, it can be seen that the width of the insulating material 20 is thicker than that of the dicing line 40, so the insulating material 20 remains on the side surface of the magnetic sheet even after the dicing process of FIG. 5B. In this case, the vertically extending substrates on the left and right sides of the coil 10 may be cut during the dicing process. Accordingly, the substrate disposed below each of the coil 10 and the insulating material 20 may be spaced apart from each other, but the present disclosure is not limited thereto.

After the dicing process, the insulating material 20 remains on both side surfaces except the side surface in which the coil 10 is exposed as shown in FIG. 5C, and the insulating material 20 replaces a function of an insulation printing process on the side surface of the coil component after dicing, so that the magnetic sheet powder at the edges of the side surface and upper and lower surfaces of the body may be blocked, thereby improving plating spread.

In particular, since the side insulation process of the body is unnecessary, a process time and equipment cost may be reduced.

Other components are substantially the same as those described above, and detailed descriptions thereof will be omitted.

Figure 6:
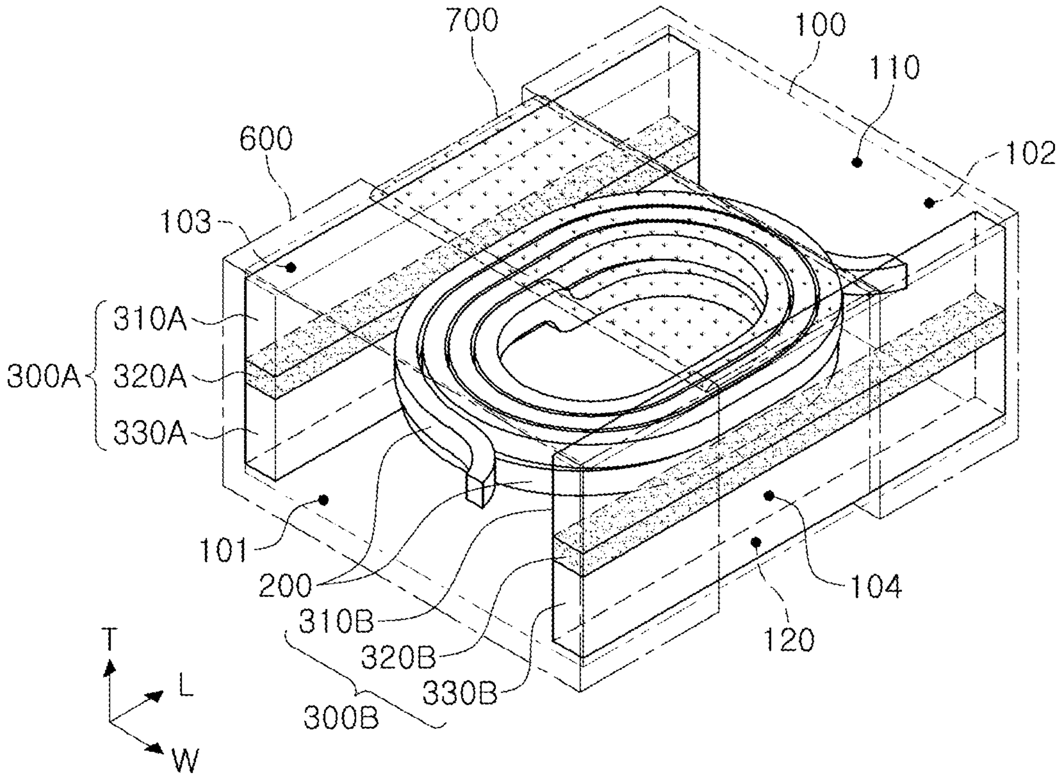
FIG. 6 is a view schematically illustrating a coil component according to an exemplary embodiment in the present disclosure.

FIG. 6 is a view schematically illustrating a coil component according to an exemplary embodiment in the present disclosure.

The coil component according to the present exemplary embodiment may include a body 100, a coil 200 disposed in the body, and an insulating member 300 disposed on at least a portion of the first to fourth side surfaces 101, 102, 103, and 104 of the body. In this case, the coil 200 may include a winding type coil. The insulating member 300 may include first and second insulating members 300A and 300B respectively disposed on side surfaces of the body 100.

In the coil component according to the present exemplary embodiment, the insulating member 300 including the first to third insulating layers 310, 320, and 330 and the coil 200 may be spaced apart from each other. In addition, the first to third insulating layers 310, 320, and 330 may cover the entire third and fourth side surfaces 103 and 104 of the body 100.

In this case, the first to third insulating layers 310, 320, and 330 may be sequentially laminated, and the second insulating layer 320 may be in contact with each of the first and third insulating layers 310 and 330. At least one of the first and third insulating layers 310 and 330 may include a photosensitive material (DFR) and the second insulating layer 320 may include a prepreg (PPG), but the present disclosure is not limited thereto.

The body 100 may further include one surface and the other surfaces 110 and 120 connected to each of the first to fourth side surfaces 101, 102, 103, and 104 and facing each other. In this case, an insulating film 700 may be additionally disposed on each of the one surface and the other surfaces 110 and 120 of the body.

In this case, each of the first and second insulating members 300A and 300B may at least partially contact each insulating film 700 disposed on one surface and the other surface 110 and 120 of the body. Also, each of the insulating films 700 disposed on one surface and the other surfaces 101 and 102 of the body may not extend to both ends of the one surface and the other surfaces 110 and 120 of the body, and thus, a length of the insulating film 700 in the length direction (L direction) may be shorter than a length thereof in the length direction (L direction) of the first and second insulating members 300A and 300B.

In addition, the insulating film 700 may include a material different from that of each of the first and second insulating members 300A and 300B, but is not limited thereto. In particular, the insulating film 700 may include a material different from each of the first and third insulating layers 310 and 330 of the insulating member 300. The first to third insulating layers 310, 320, and 330 of the insulating member may be formed by laminating an insulating material before the dicing process of the coil bar, but the insulating film 700 disposed on each of the one surface and the other surfaces 110 and 120 of the body 100 may be formed by applying an insulating paste after dicing, so the materials may be different. In this case, each of the first and third insulating layers 310 and 330 of the insulating member may include a photosensitive material (DFR), but is not limited thereto.

In the coil component according to the present exemplary embodiment, the insulating member 300 exposed to the first and second side surfaces 101 and 102 of the body 100 may not extend to both end portions of the first and second side surfaces 101 and 102 of the body. Specifically, although not shown, the insulating member 300 exposed to the first and second side surfaces 101 and 102 of the body may expose each of the coil 200 and a lead pattern, may further expose the substrate 400 supporting the coil 200, and may expose the first and second insulating members 300A and 300B spaced apart from each of the coil 200 and the lead pattern, but the present disclosure is not limited thereto. In particular, when the substrate 400 supporting the coil 200 is disposed, the substrate 400 may be further exposed to be spaced apart from each of the first and second insulating members 300A and 300B.

In addition, although not shown, the coil may further include a lead pattern disposed in the body 100, connected to the coil 200, and at least partially exposed to each of the first and second side surfaces 101 and 102 of the body. In this case, the insulating member 300 spaced apart from the lead pattern may be disposed or exposed on each of the first and second side surfaces 101 and 102 of the body.

Each of the coil 200, the lead pattern and the via may be formed of a conductive material such as copper (Cu), aluminum (Al), silver (Ag), tin (Sn), gold (Au), nickel (Ni), lead (Pb), titanium (Ti), or an alloy thereof, but the present disclosure is not limited thereto.

The coil component according to the present exemplary embodiment may further include an external electrode 600 disposed on at least a portion of the first to fourth side surfaces 101, 102, 103, and 104 of the body 100. Here, at least a portion of the external electrode 600 may be in contact with the lead pattern on each of the first and second side surfaces 101 and 102 of the body.

Other components are substantially the same as those described above, and thus, detailed descriptions thereof will be omitted.

As one effect among various effects of the present disclosure, the coil component that may be mounted on a substrate including a microcircuit pattern may be provided.

As another effect among the various effects of the present disclosure, a coil component capable of reducing the incidence of defective product may be provided.

As another effect among the various effects of the present disclosure, a cost and time for manufacturing coils may be reduced by reducing an insulation process.

While exemplary embodiments have been shown and described above, it will be apparent to those skilled in the art that modifications and variations could be made without departing from the scope of the present disclosure as defined by the appended claims.

What is claimed is:

1. A coil component comprising:

a body having first to fourth side surfaces;

a coil disposed in the body; and an insulating member disposed on at least one of the first to fourth side surfaces of the body and including first to third insulating layers, wherein the first and third insulating layers are stacked in a thickness direction thereof, and the first and third insulating layers are disposed inside the body in the thickness direction.

2. The coil component of claim 1, wherein the insulating member includes first and second insulating members respectively disposed on third and fourth side surfaces connected to a first side surface of the body and a second side surface, opposing the first side surface, and facing each other.

3. The coil component of claim 1, wherein the coil is disposed to be spaced apart from the insulating member.

4. The coil component of claim 1, wherein at least one of the first to third insulating layers of the insulating member includes a photosensitive material.

5. The coil component of claim 4, further comprising a substrate disposed in the body, supporting the coil, spaced apart from the insulating member, and including a material different from a material of each of the first to third insulating layers.

6. The coil component of claim 5, wherein each of the substrate and the second insulating layer includes prepreg (PPG).

7. The coil component of claim 6, further comprising:

first and second coating layers covering each of the substrate and the second insulating layer, wherein glass fiber is exposed to a side surface of each of the substrate and the second insulating layer to be in contact with each of the first and second coating layers.

8. The coil component of claim 5, wherein the second insulating layer of the insulating member is in contact with each of the first to third insulating layers, and the substrate and the second insulating layer include the same material.

9. The coil component of claim 8, further comprising:

a lead pattern disposed in the body and connected to the coil; and an external electrode disposed in at least a portion of the first to fourth side surfaces of the body and at least partially in contact with the lead pattern.

10. The coil component of claim 9, wherein each of the first to third insulating layers of the insulating member includes a material different from a material of an insulating film disposed on a surface of the body.

11. The coil component of claim 8, wherein the body further includes one surface and the other surface connected to each of the first to fourth side surfaces of the body and facing each other, wherein the coil component further includes: an insulating film disposed on each of the one surface and the other surface of the body.

12. The coil component of claim 1, further comprising a lead pattern disposed in the body and connected to the coil.

13. The coil component of claim 12, further comprising an external electrode disposed on at least a portion of the first to fourth side surfaces of the body and disposed to be at least partially in contact with the lead pattern.

14. The coil component of claim 13, wherein at least a portion of the external electrode is further in contact with the insulating member.

15. The coil component of claim 1, wherein the body further includes one surface and the other surface connected to each of the first to fourth side surfaces of the body and facing each other, wherein the coil component further includes: an insulating film disposed on each of the one surface and the other surface of the body.

16. The coil component of claim 15, wherein the insulating film is at least partially in contact with the insulating member.

17. The coil component of claim 1, wherein the insulating member has one surface and the other surface facing the one surface, and each of the one surface and the other surface of the insulating member is at least partially in contact with the body.

18. The coil component of claim 1, wherein the first to third insulation layers are disposed on the same side surface of the body.

19. The coil component of claim 1, wherein the second insulation layer extends beyond the third insulation layer along a direction orthogonal to a longitudinal axis of the second and third insulation layers.

20. A coil component comprising:

a body having first to fourth side surfaces;

a coil disposed in the body; and an insulating member disposed on at least one of the first to fourth side surfaces of the body and including first to third insulating layers, wherein the body further includes one surface and the other surface connected to each of the first to fourth side surfaces of the body and facing each other, wherein the coil component further includes: an insulating film disposed on each of the one surface and the other surface of the body, and wherein each of the first to third insulating layers of the insulating member includes a material different from a material of the insulating film.

21. A coil component comprising:

a body having first to fourth side surfaces;

a coil disposed in the body; and an insulating member disposed on at least one of the first to fourth side surfaces of the body and including first to third insulating layers, wherein the second insulation layer extends beyond the first insulation layer along a direction orthogonal to a longitudinal axis of the first and second insulation layers.

* * * * *